(12) United States Patent
Liao et al.

(10) Patent No.: US 10,629,142 B2
(45) Date of Patent: Apr. 21, 2020

(54) LIQUID CRYSTAL DISPLAY DEVICE

(71) Applicant: Shenzhen China Star Optoelectronics Technology Co., Ltd., Shenzhen, Guangdong (CN)

(72) Inventors: Bingjei Liao, Guangdong (CN); Yu Wu, Guangdong (CN); Xiaoliang Guan, Guangdong (CN); Geng Wang, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 45 days.

(21) Appl. No.: 15/749,327

(22) PCT Filed: Jan. 12, 2018

(86) PCT No.: PCT/CN2018/072509
§ 371 (c)(1),
(2) Date: Jan. 31, 2018

(87) PCT Pub. No.: WO2019/127668
PCT Pub. Date: Jul. 4, 2019

(65) Prior Publication Data
US 2019/0206341 A1   Jul. 4, 2019

(30) Foreign Application Priority Data

Dec. 28, 2017   (CN) .......................... 2017 1 466109

(51) Int. Cl.
*G09G 3/36* (2006.01)
*G02F 1/1343* (2006.01)
*G09G 3/00* (2006.01)

(52) U.S. Cl.
CPC ......... *G09G 3/3607* (2013.01); *G02F 1/1343* (2013.01); *G09G 3/00* (2013.01);
(Continued)

(58) Field of Classification Search
CPC .............. G09G 3/3607; G09G 3/3611; G09G 2300/0426; G09G 2300/0452; G02F 1/1343
See application file for complete search history.

(56) References Cited

U.S. PATENT DOCUMENTS

2002/0149598 A1* 10/2002 Greier ................. G09G 3/3611
345/589
2008/0024706 A1* 1/2008 Yang ................. G02F 1/133707
349/129
(Continued)

FOREIGN PATENT DOCUMENTS

CN   101009083 A   8/2007
CN   104795037 A   7/2015
(Continued)

*Primary Examiner* — Wing H Chow
(74) *Attorney, Agent, or Firm* — Hemisphere Law, PLLC; Zhigang Ma

(57) ABSTRACT

A liquid crystal display device is provided. The liquid crystal display device includes a plurality of sub-pixels arranged in matrix, each sub-pixels is an eight domains structure; in a frame image, the data signals of the sub-pixels in two adjacent columns have opposite polarities, and in two adjacent frame images, the data signals of the same sub-pixel have opposite polarities; each two adjacent sub-pixels in a row direction are a sub-pixel group, in two adjacent sub-pixel groups, the sub-pixels in one sub-pixel group display a brightness of a first display gray scale corresponding to the sub-pixels, the sub-pixels in another sub-pixel group display a brightness of a second display gray scale corresponding to the sub-pixels; by performing the color shift compensation process on the data signals of the sub-pixels in the eight-domain structure, the color viewing angle and the viewing experience of the liquid crystal display device could be improved.

12 Claims, 4 Drawing Sheets

(52) U.S. Cl.
CPC ... *G09G 3/3611* (2013.01); *G09G 2300/0426* (2013.01); *G09G 2300/0452* (2013.01)

(56) References Cited

U.S. PATENT DOCUMENTS

2008/0198285 A1    8/2008  Hsieh et al.
2011/0141420 A1*  6/2011  Chen ................. G02F 1/133707
                                                       349/129

FOREIGN PATENT DOCUMENTS

| CN | 106782375 A | 5/2017 |
| CN | 107134270 A | 9/2017 |
| CN | 107463040 A | 12/2017 |
| CN | 107464541 A | 12/2017 |

* cited by examiner

LIQUID CRYSTAL DISPLAY DEVICE

RELATED APPLICATIONS

The present application is a National Phase of International Application Number PCT/CN2018/072509, filed on Jan. 12, 2018, and claims the priority of China Application 201711466109.4, filed on Dec. 28, 2017.

FIELD OF THE DISCLOSURE

The disclosure relates to a display technical field, and more particularly to a display device.

BACKGROUND

With the development of display technologies, flat panel display devices such as liquid crystal displays (LCDs) are widely used in mobile phones, televisions, personal digital assistants, digital cameras, laptops, desktop computers and other consumer electronics products because of their advantages of high image quality, low power consumption, thin body and wide application range, and become the mainstream in display device.

As far as the liquid crystal displays in the mainstream market are concerned, there are three types of LCDs: Twisted Nematic (TN) or Super Twisted Nematic (STN) type, In-Plane Switching (IPS) type and Vertical Alignment (VA) type. The VA type liquid crystal display has extremely high contrast relative to other types of liquid crystal displays, generally up to 4000-8000, so the VA type liquid crystal display has a very wide range of applications in large-size display such as television, and the IPS type has more excellent color viewing angle than the VA-type.

In order to make VA type liquid crystal display panel get a better color viewing angle to improve the color shift problem, a multi-domain VA (MVA) technique is adopted generally. That is, one sub-pixel is divided into a plurality of regions, and the liquid crystal in each region is tilted in different directions after voltage is applied so as to make the effect be seen in all directions to be uniform. A method for implementing the MVA technology is usually to make the pixel electrodes of each sub-pixel in the liquid crystal display panel into a "✷" type pattern so as to divide the region corresponding to the pixel electrode into four areas (i.e. a four-domain structure), the pixel electrodes in the four areas are respectively formed with a pattern of pixel electrode branches and slit intervals extending in different directions, the oblique electric field generated by the pixel electrodes could induce the liquid crystal molecules in different areas to tilt in different directions to achieve the purpose of improving the color viewing angle.

Furthermore, in order to improve the effect of improving the color viewing angle, the prior art also proposes to divide the pixel electrode of one sub-pixel into the main region pixel electrode and the sub region pixel electrode, then the main region pixel electrode and the sub region pixel electrode are respectively made into "✷" pattern in eight-domain structure, compared with the four-domain structure, the eight-domain structure to improve the viewing angle better, but compared with the IPS type liquid crystal display and the OLED display, the color viewing angle is still low, which needs to be further improved.

In addition to multi-domain VA technology, in the prior art, there is also a method for improving chromaticity viewing angle, that is, a color shift compensation process is performed on an input data signal voltage through a color shift compensation algorithm, which specifically includes: generating a first display gray scale value and a second display gray scale value respectively according to an original gray scale value of each basic color component of each image pixels of the image to be displayed, using the first display gray scale value and the second display gray scale value to respectively control the display brightness of two adjacent sub-pixels of the same color on the liquid crystal panel, wherein the first display gray scale value is greater than the second display gray scale value, so that the driving voltages applied to the two subpixels are different to make the liquid crystal molecules of the two subpixels are tilted to different angles. Therefore, the better watching effect could be obtained at different viewing angles to achieve the purpose of reducing color shift.

SUMMARY

An objective of the disclosure is providing a liquid crystal display device to improve the color viewing angle and the viewing experience of the liquid crystal display device the color viewing angle and the viewing experience of the liquid crystal display device the color viewing angle and the viewing experience of the liquid crystal display device.

To achieve the above object, according to one aspect, the embodiment of the disclosure provides a liquid crystal display device including:

a plurality of sub-pixels, arranged in matrix, each of the sub-pixels is an eight domains structure;

wherein the sub-pixels include a first sub-pixel, a second sub-pixel and a third sub-pixel, the colors of the first sub-pixel, the second sub-pixel and the third sub-pixel are different, the sub-pixels located in the same row are sequentially arranged in the order of the first sub-pixel, the second sub-pixel and the third sub-pixel, the colors of the sub-pixels located in the same column are the same;

wherein in a frame image, the data signals of the sub-pixels in two adjacent columns have opposite polarities, and in two adjacent frame images, the data signals of the same sub-pixel have opposite polarities;

wherein each two adjacent sub-pixels in a row direction are a sub-pixel group, in two adjacent sub-pixel groups, the sub-pixels in one sub-pixel group display a brightness of a first display gray scale corresponding to the sub-pixels, the sub-pixels in another sub-pixel group display a brightness of a second display gray scale corresponding to the sub-pixels;

wherein the first display gray scale and the second display gray scale corresponding to each of the sub-pixels are generated by an original gray scale of a basic color component corresponding to the sub-pixel processed by a color shift compensation, and the first display gray scale is greater than the second display gray scale.

The first sub-pixel, the second sub-pixel and the third sub-pixel respectively display one of blue, green and red.

The original gray scale of the basic color component processed by the color shift compensation is through a predetermined color shift compensation algorithm to generate the first display gray scale and the second display gray scale.

The predetermined color shift compensation algorithm is: an average value of the brightness corresponding to the first display gray scale and the brightness corresponding to the second display gray scale is equal to the brightness corresponding to the original gray scale.

Each of the basic color component is corresponding to two of the sub-pixels, the two of the sub-pixels are adjacent on a column direction and respectively display the first display gray scale and the second display gray scale.

The liquid crystal display device further includes: a plurality of data lines and a plurality of scan lines, wherein each of the scan lines is respectively arranged corresponding to each row of the sub-pixels and is electrically connected to the sub-pixels in each row of the sub-pixels, and each of the data lines is respectively arranged corresponding to each column of the sub-pixels and is electrically connected to the sub-pixels in each column of the sub-pixels.

The original gray scale, the first display gray scale and the second display gray scale all have a value range of 0~255.

Each of the sub-pixels comprises: a main region pixel electrode and a sub region pixel electrode, the main region pixel electrode and the sub region pixel electrode both are "✳" type pattern electrode, and each of the sub-pixels is the eight domains structure.

The liquid crystal display device is a vertical alignment (VA) type liquid crystal display device.

The disclosure further provides a liquid crystal display device, comprising:
- a plurality of sub-pixels, arranged in matrix, each of the sub-pixels is an eight domains structure;
- wherein the sub-pixels include a first sub-pixel, a second sub-pixel and a third sub-pixel, the colors of the first sub-pixel, the second sub-pixel and the third sub-pixel are different, the sub-pixels located in the same row are sequentially arranged in the order of the first sub-pixel, the second sub-pixel and the third sub-pixel, the colors of the sub-pixels located in the same column are the same;
- wherein in a frame image, the data signals of the sub-pixels in two adjacent columns have opposite polarities, and in two adjacent frame images, the data signals of the same sub-pixel have opposite polarities;
- wherein each two adjacent sub-pixels in a row direction are a sub-pixel group, in two adjacent sub-pixel groups, the sub-pixels in one sub-pixel group display a brightness of a first display gray scale corresponding to the sub-pixels, the sub-pixels in another sub-pixel group display a brightness of a second display gray scale corresponding to the sub-pixels;
- wherein the first display gray scale and the second display gray scale corresponding to each of the sub-pixels are generated by an original gray scale of a basic color component corresponding to the sub-pixel processed by a color shift compensation, and the first display gray scale is greater than the second display gray scale;
- wherein the first sub-pixel, the second sub-pixel and the third sub-pixel respectively display one of blue, green and red;
- wherein the original gray scale of the basic color component processed by the color shift compensation is through a predetermined color shift compensation algorithm to generate the first display gray scale and the second display gray scale;
- wherein the predetermined color shift compensation algorithm is: an average value of the brightness corresponding to the first display gray scale and the brightness corresponding to the second display gray scale is equal to the brightness corresponding to the original gray scale;
- wherein each of the basic color component is corresponding to two of the sub-pixels, the two of the sub-pixels are adjacent on a column direction and respectively display the first display gray scale and the second display gray scale.

The beneficial effects of the disclosure are as follows: a liquid crystal display device is provided. The liquid crystal display device includes a plurality of sub-pixels arranged in matrix, each sub-pixels is an eight domains structure; in a frame image, the data signals of the sub-pixels in two adjacent columns have opposite polarities, and in two adjacent frame images, the data signals of the same sub-pixel have opposite polarities; each two adjacent sub-pixels in a row direction are a sub-pixel group, in two adjacent sub-pixel groups, the sub-pixels in one sub-pixel group display a brightness of a first display gray scale corresponding to the sub-pixels, the sub-pixels in another sub-pixel group display a brightness of a second display gray scale corresponding to the sub-pixels; by performing the color shift compensation process on the data signals of the sub-pixels in the eight-domain structure, the color viewing angle and the viewing experience of the liquid crystal display device could be improved.

BRIEF DESCRIPTION OF THE DRAWINGS

Accompanying drawings and the following detailed descriptions are for providing further understanding of embodiments of the disclosure. However, the drawings are only for reference and description, and are not intended to limit the disclosure. In figures.

DETAILED DESCRIPTION OF PREFERRED EMBODIMENTS

In order to understand the above objectives, features and advantages of the present disclosure more clearly, the present disclosure is described in detail below with references to the accompanying drawings and specific embodiments.

Figure 1:
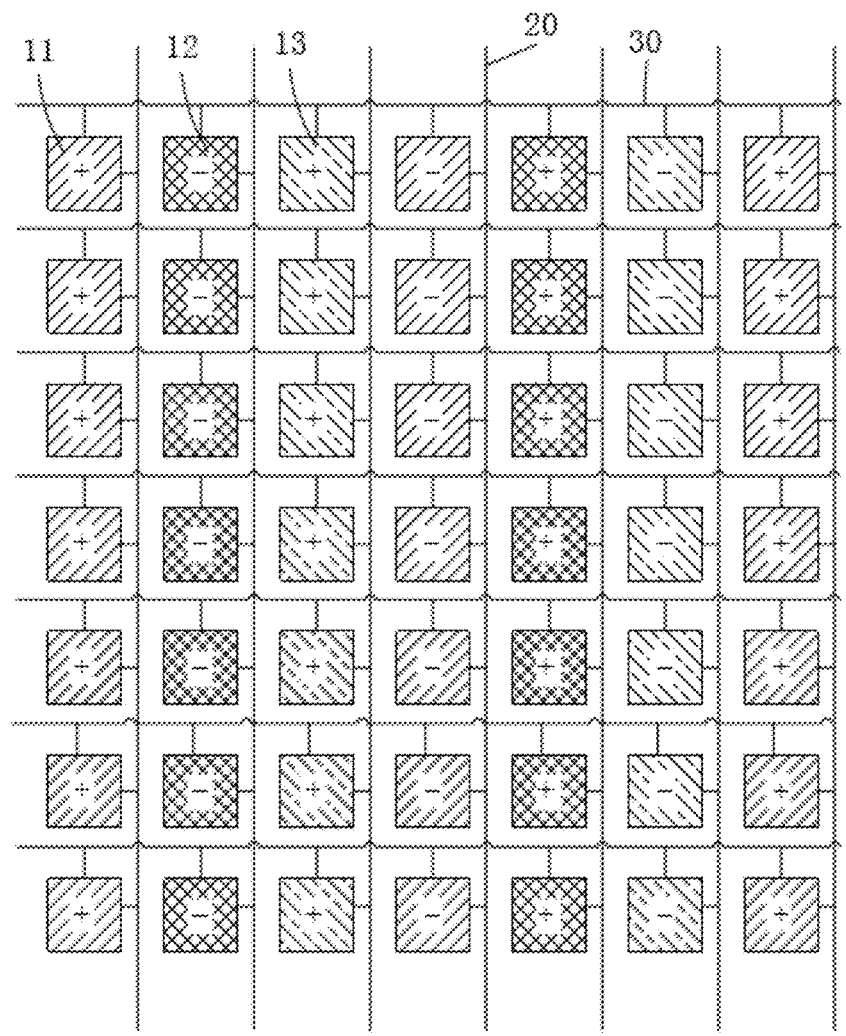
FIG. 1 and FIG. 2 are polarity distribution diagrams in two adjacent frame images of a liquid crystal display device according to an embodiment of the disclosure.
Figure 2:
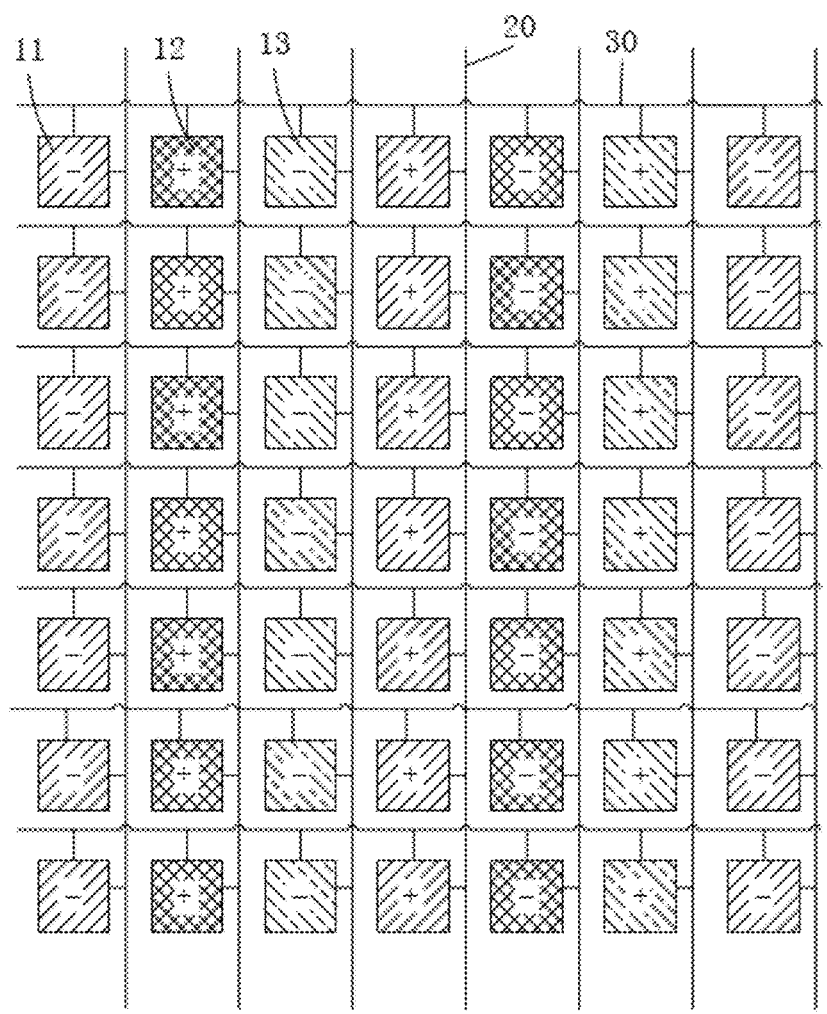
Figure 3:
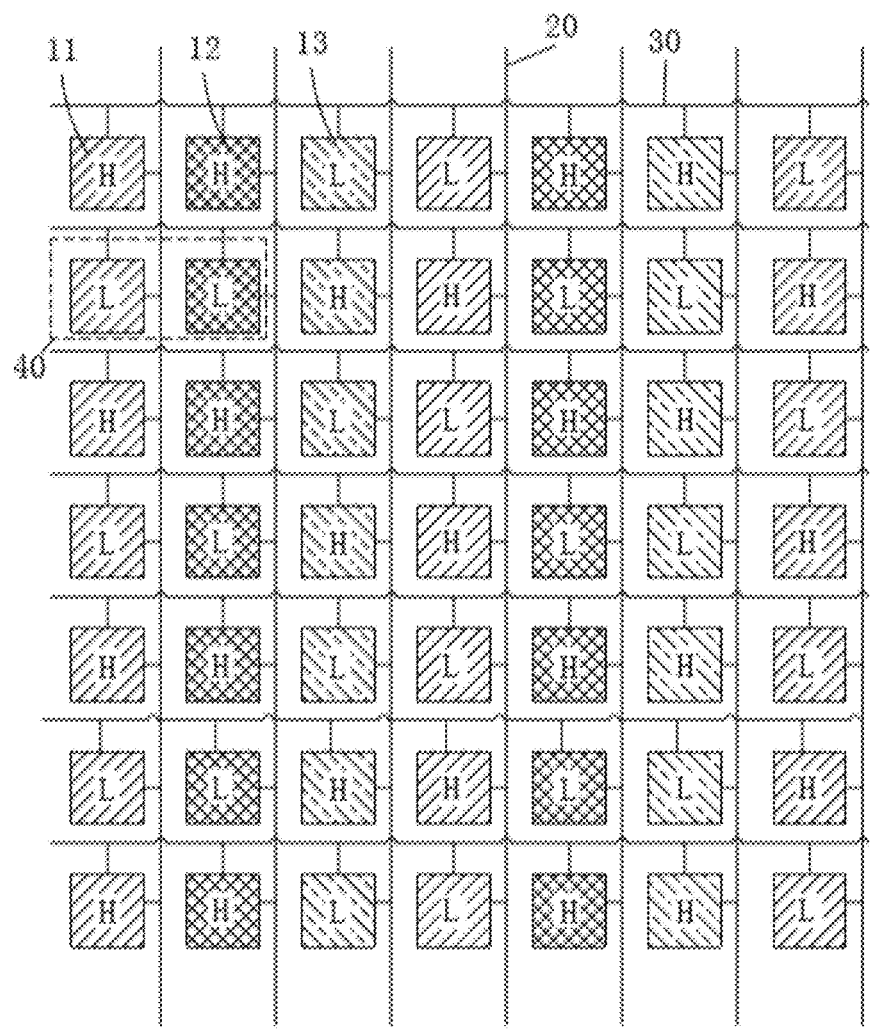
FIG. 3 is a brightness and darkness distribution diagram when displaying of a liquid crystal display device according to an embodiment of the disclosure.

Please refer to FIG. 1 to FIG. 3, the disclosure provides a liquid crystal display device, the liquid crystal display device is a vertical alignment (VA) type liquid crystal display device, including: a plurality of sub-pixels arranged in matrix, each of the sub-pixels is an eight domains structure.

The sub-pixels include a first sub-pixel 11, a second sub-pixel 12 and a third sub-pixel 13, the colors of the first sub-pixel 11, the second sub-pixel 12 and the third sub-pixel 13 are different, the sub-pixels located in the same row are sequentially and repeatedly arranged in the order of the first sub-pixel 11, the second sub-pixel 12 and the third sub-pixel 13, the colors of the sub-pixels located in the same column are the same.

Specifically, the first sub-pixel 11, the second sub-pixel 12 and the third sub-pixel 13 respectively display one of blue, green and red, so the first sub-pixel 11, the second sub-pixel 12 and the third sub-pixel 13 could from a basic display pixel to display color image. Preferably, the first sub-pixel 11, the second sub-pixel 12 and the third sub-pixel 13 respectively display blue, green and red.

Figure 4:
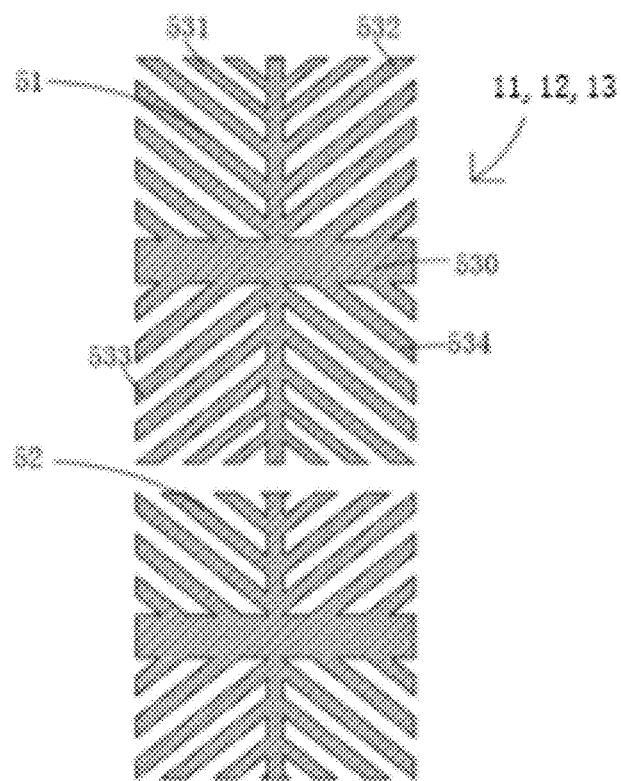
FIG. 4 is a structural schematic view of a sub-pixel of a liquid crystal display device according to an embodiment of the disclosure.

Furthermore, as shown in FIG. 4, the first sub-pixel 11, the second sub-pixel 12 and the third sub-pixel 13 in the disclosure are the eight domains structures. Specifically, the eight-domain structure can be achieved by the following method: arranging a main region pixel electrode 51 and a sub region pixel electrode 52 adjacent to the main region pixel electrode 51, and the main region pixel electrode 51 and the sub region pixel electrode 52 both are "✻" type pattern electrode, so the four domains are formed by the main region pixel electrode 51 and the other four domains are formed by the sub region pixel electrode 52, corresponds to one sub-pixel, that is, eight domains. The eight domains structure can make the liquid crystal molecules in different domains tilt in different directions, so as to effectively improve the color viewing angle of the liquid crystal display device.

Specifically, a typical structure of the "✻" type pattern electrode is as shown in FIG. 4, and includes: a main electrode 530 with a cross shape, a plurality of first branch electrodes 531 arranged in parallel at an interval and slanted relative to a horizontal direction, a plurality of second branch electrodes 532 mirror-symmetrical to the first branch electrodes 531 with respect to the vertical edge of the main electrode 530, a plurality of third branch electrodes 533 mirror-symmetrical to the first branch electrodes 531 with respect to the horizontal edge of the main electrode 530 and a plurality of fourth branch electrodes 534 mirror-symmetrical to the third branch electrodes 533 with respect to the vertical edge of the main electrode 530, the first branch electrodes 531, the second branch electrodes 532, the third branch electrodes 533 and the fourth branch electrodes 534 respectively extends in different directions to form four domains, the liquid crystal molecules corresponding to each domain are tilted in different directions, so as to improve the color viewing angle.

In addition, liquid crystal molecules have a characteristic, if the liquid crystal molecules are applied the same voltage for a long time, the liquid crystal molecules will be polarized, even if the voltage is canceled, the liquid crystal molecules will not be able to rotate according to the change of the electric field due to the destruction of the characteristics. Therefore, the liquid crystal display device must be driven by alternating current to flip the liquid crystal molecules at a certain frequency when the display screen is displaying to prevent the liquid crystal molecules from being biased in the same direction and lose their activity.

Therefore, in order to prevent the polarization of liquid crystal molecules, please refer to FIG. 1 and FIG. 2, the disclosure further arranges the data signals of the sub-pixels in two adjacent columns to have opposite polarities in a frame image, and the data signals of the same sub-pixel to have opposite polarities in two adjacent frame images, so the alternating current driving could be achieved to ensure the normal operation of liquid crystal display device.

It should be noted that, referring to FIG. 3, in order to further improve the chromaticity viewing angle of the liquid crystal display device on the basis of the eight domains structure, the disclosure further performs a color shift compensation process on the liquid crystal display device, specifically is: each two adjacent sub-pixels in a row direction are a sub-pixel group 40, in two adjacent sub-pixel groups 40, the sub-pixels in one sub-pixel group 40 display a brightness of a first display gray scale corresponding to the sub-pixels, the sub-pixels in another sub-pixel group 40 display a brightness of a second display gray scale corresponding to the sub-pixels.

The first display gray scale and the second display gray scale corresponding to each of the sub-pixels are generated by an original gray scale of a basic color component corresponding to the sub-pixel processed by a color shift compensation, and the first display gray scale is greater than the second display gray scale.

Wherein, each image is composed of a plurality of image pixels when the liquid crystal display device displays, each image pixel includes three different color basic color components, a first basic color component, a second basic color component, and a third basic color component. Generally, the first basic color component, the second basic color component and the third basic color component are the red component, the green component and the blue component, the brightness of the basic color component is controlled by providing a gray scale to each basic color component of each image pixel for displaying when driving an frame image to display, so that the basic color component displays the corresponding color to realize the display of the image.

Each of the basic color components controls two sub-pixels of the same color and adjacent in the row direction in an image pixel, that is, the red component controls two red sub-pixels, the green component controls two green sub-pixels, and the blue component controls two blue sub-pixels, so after the color shift compensation algorithm processed on the original gray scale of each basic color component by the predetermined color shift compensation algorithm, the first display gray scale and the second display gray scale generated from the original gray scale of the red component respectively control the display brightness of the two corresponding red sub-pixels, the first display gray scale and the second display gray scale generated from the original gray scale of the green component respectively control the display brightness of the two corresponding green sub-pixels, and the first display gray scale and the second display gray scale generated from the original gray scale of the blue component respectively control the display brightness of the two corresponding blue sub-pixels.

The display brightness of each image pixel is a mixture of the display brightness of its corresponding primary color component, the display brightness of each primary color component is a mixture of the display brightness of its corresponding two sub-pixels. Generally, in order to keep the display brightness of the two sub-pixels controlled by the original gray scales consistent with the display brightness of the two sub-pixels controlled by the first display gray scale and the second display gray scale, the predetermined color compensation algorithm is usually that an average value of the brightness corresponding to the first display gray scale and the brightness corresponding to the second display gray scale is equal to the brightness corresponding to the original gray scale.

For example, as shown in FIG. 3, the sub-pixel displaying the first display gray scale is the bright state H, and the sub-pixel displaying the second display gray scale is the dark state L. As can be seen from FIG. 3, when both sub-pixels in a sub-pixel group 40 are in the bright state H, the sub-pixels in the sub-pixel group 40 adjacent to the sub-pixel group 40 are both in the dark state L, and when both sub-pixels in a sub-pixel group 40 are in the dark state L, the sub-pixels in the sub-pixel group 40 adjacent to the sub-pixel group 40 are both in the bright state H, by practice of the alternating light and dark mode, the color viewing angle of the liquid crystal display device and the display effect could be further improved.

Specifically, the liquid crystal display device further includes a plurality of data lines and a plurality of scan lines, wherein each of the scan lines is respectively arranged corresponding to each row of the sub-pixels and is electrically connected to the sub-pixels in each row of the sub-pixels, and each of the data lines is respectively arranged corresponding to each column of the sub-pixels and is electrically connected to the sub-pixels in each column of the sub-pixels.

Specifically, the original gray scale, the first display gray scale and the second display gray scale all have a value range of 0~255.

In summary, the disclosure provides a liquid crystal display device, including a plurality of sub-pixels arranged in matrix, each sub-pixels is an eight domains structure; in a frame image, the data signals of the sub-pixels in two adjacent columns have opposite polarities, and in two adjacent frame images, the data signals of the same sub-pixel have opposite polarities; each two adjacent sub-pixels in a row direction are a sub-pixel group, in two adjacent sub-pixel groups, the sub-pixels in one sub-pixel group display a brightness of a first display gray scale corresponding to the sub-pixels, the sub-pixels in another sub-pixel group display a brightness of a second display gray scale corresponding to the sub-pixels; by performing the color shift compensation process on the data signals of the sub-pixels in the eight-domain structure, the color viewing angle and the viewing experience of the liquid crystal display device could be improved.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A liquid crystal display device, comprising
a plurality of sub-pixels, arranged in matrix, each of the sub-pixels is an eight domains structure;
wherein the sub-pixels are divided into a plurality of first sub-pixels, a plurality of second sub-pixels and a plurality of third sub-pixels a color of each of the first sub-pixels is different from a color of each of the second sub-pixels and a color of each of the third sub-pixels, the color of each of the second sub-pixels is different from the color of each of the third sub-pixels, the sub-pixels located in a same row are sequentially arranged in the order of one of the first sub-pixels, one of the second sub-pixels and one of the third sub-pixels, the colors of the sub-pixels located in a same column are the same;
wherein in a frame image, the data signals of the sub-pixels in two adjacent columns have opposite polarities, and the data signals of the sub-pixels located in the same column have same polarities; and in two adjacent frame images, the data signals of the same sub-pixel have opposite polarities;
wherein two adjacent sub-pixels in a row direction form a sub-pixel group, in two adjacent sub-pixel groups along a column direction, the sub-pixels in one of the two adjacent sub-pixel groups display a brightness of a first display gray scale corresponding to the sub-pixels in the one of the two adjacent sub-pixel groups, the sub-pixels in another one of the two adjacent sub-pixel groups display a brightness of a second display gray scale corresponding to the sub-pixels in the another one of the two adjacent sub-pixel groups;

wherein the first display gray scale and the second display gray scale corresponding to each of the sub-pixels are generated by an original gray scale of a basic color component corresponding to the sub-pixel processed by a color shift compensation, and the first display gray scale for the sub-pixel displaying a first color in one of the two adjacent sub-pixel groups is greater than the second display gray scale for the sub-pixel displaying the first color in the another one of the two adjacent sub-pixel groups.

2. The liquid crystal display device according to claim 1, wherein each of the first sub-pixel, each of the second sub-pixel and each of the third sub-pixel respectively display one of blue, green and red.

3. The liquid crystal display device according to claim 1, wherein the original gray scale of the basic color component processed by the color shift compensation is through a predetermined color shift compensation algorithm to generate the first display gray scale and the second display gray scale.

4. The liquid crystal display device according to claim 3, wherein the predetermined color shift compensation algorithm is: an average value of the brightness corresponding to the first display gray scale and the brightness corresponding to the second display gray scale is equal to the brightness corresponding to the original gray scale.

5. The liquid crystal display device according to claim 1, wherein each of the basic color component is corresponding to two of the sub-pixels, the two of the sub-pixels are adjacent on the column direction and respectively display the first display gray scale and the second display gray scale.

6. The liquid crystal display device according to claim 1, further comprising: a plurality of data lines and a plurality of scan lines, wherein each of the scan lines is respectively arranged corresponding to each row of the sub-pixels and is electrically connected to the sub-pixels in each row of the sub-pixels, and each of the data lines is respectively arranged corresponding to each column of the sub-pixels and is electrically connected to the sub-pixels in each column of the sub-pixels.

7. The liquid crystal display device according to claim 1, wherein the original gray scale, the first display gray scale and the second display gray scale all have a value range of 0~255.

8. The liquid crystal display device according to claim 1, wherein the liquid crystal display device is a vertical alignment (VA) type liquid crystal display device.

9. A liquid crystal display device, comprising:
a plurality of sub-pixels, arranged in matrix, each of the sub-pixels is an eight domains structure;
wherein the sub-pixels are divided into a plurality of first sub-pixels, a plurality of second sub-pixels and a plurality of third sub-pixels a color of each of the first sub-pixels is different from a color of each of the second sub-pixels and a color of each of the third sub-pixels, the color of each of the second sub-pixels is different from the color of each of the third sub-pixels, the sub-pixels located in a same row are sequentially arranged in the order of one of the first sub-pixels, one of the second sub-pixels and one of the third sub-pixels, the colors of the sub-pixels located in a same column are the same;
wherein in a frame image, the data signals of the sub-pixels in two adjacent columns have opposite polarities, and the data signals of the sub-pixels located in the same column have same polarities; and in two adjacent frame images, the data signals of the same sub-pixel have opposite polarities;

wherein two adjacent sub-pixels in a row direction form a sub-pixel group, in two adjacent sub-pixel groups along a column direction, the sub-pixels in one of the two adjacent sub-pixel groups display a brightness of a first display gray scale corresponding to the sub-pixels in the one of the two adjacent sub-pixel groups, the sub-pixels in another one of the two adjacent sub-pixel groups display a brightness of a second display gray scale corresponding to the sub-pixels in the another one of the two adjacent sub-pixel groups;

wherein the first display gray scale and the second display gray scale corresponding to each of the sub-pixels are generated by an original gray scale of a basic color component corresponding to the sub-pixel processed by a color shift compensation, and the first display gray scale for the sub-pixel displaying a first color in one of the two adjacent sub-pixel groups is greater than the second display gray scale for the sub-pixel displaying the first color in the another one of the two adjacent sub-pixel groups;

wherein the first sub-pixel, the second sub-pixel and the third sub-pixel respectively display one of blue, green and red;

wherein the original gray scale of the basic color component processed by the color shift compensation is through a predetermined color shift compensation algorithm to generate the first display gray scale and the second display gray scale;

wherein the predetermined color shift compensation algorithm is: an average value of the brightness corresponding to the first display gray scale and the brightness corresponding to the second display gray scale is equal to the brightness corresponding to the original gray scale;

wherein each of the basic color component is corresponding to two of the sub-pixels, the two of the sub-pixels are adjacent on the column direction and respectively display the first display gray scale and the second display gray scale.

10. The liquid crystal display device according to claim 9, further comprising: a plurality of data lines and a plurality of scan lines, wherein each of the scan lines is respectively arranged corresponding to each row of the sub-pixels and is electrically connected to the sub-pixels in each row of the sub-pixels, and each of the data lines is respectively arranged corresponding to each column of the sub-pixels and is electrically connected to the sub-pixels in each column of the sub-pixels.

11. The liquid crystal display device according to claim 9, wherein the original gray scale, the first display gray scale and the second display gray scale all have a value range of 0~255.

12. The liquid crystal display device according to claim 9, wherein the liquid crystal display device is a vertical alignment (VA) type liquid crystal display device.

* * * * *